United States Patent [19]

Altenhof et al.

[11] 4,019,711
[45] Apr. 26, 1977

[54] MOULD FOR CLOSURE CAPS WITH INTERMITTENT THREADS UNDERCUTS OR HOLD-DOWN LUGS

[75] Inventors: Jack Altenhof; John Altenhof, both of Windsor; Robert Chartier, Toronto, all of Canada

[73] Assignees: J & J Tool and Mold Ltd.; Consumers Glass Co., Ltd., both of Toronto, Canada

[22] Filed: Nov. 10, 1975

[21] Appl. No.: 630,327

[52] U.S. Cl. .................................. 249/59; 249/68; 249/180; 249/184; 425/DIG. 5; 425/DIG. 58; 425/438

[51] Int. Cl.² .................... B29F 1/14; B29D 15/00; B29C 7/00

[58] Field of Search ............ 249/59, 178, 180, 184, 249/186, 67, 68; 425/438, DIG. 5, DIG. 58

[56] References Cited

UNITED STATES PATENTS

| | | | |
|---|---|---|---|
| 2,327,665 | 8/1943 | Peat | 249/59 |
| 2,676,372 | 4/1954 | Venner et al. | 249/180 |
| 2,799,049 | 7/1957 | Wilson | 425/DIG. 58 |
| 2,948,031 | 8/1960 | Webb | 249/180 X |
| 3,247,548 | 4/1966 | Fields et al. | 425/438 |
| 3,482,814 | 12/1969 | Hedgewick | 249/67 |
| 3,482,815 | 12/1969 | Naturale | 249/180 |
| 3,534,443 | 10/1970 | Tucker | 249/68 X |
| 3,584,111 | 6/1971 | Allison | 425/438 X |
| 3,660,001 | 5/1972 | Roehr | 249/59 X |
| 3,865,529 | 2/1975 | Gugzo | 249/184 X |
| 3,904,165 | 9/1975 | Boer | 425/438 X |
| 3,940,103 | 2/1976 | Hilaire | 249/59 X |

Primary Examiner—J. Howard Flint, Jr.

[57] ABSTRACT

A core is provided, useful in the manufacture of closure caps, each closure cap having a top, dependent skirt and securing means, comprising intermittent or interrupted threads or hold-down lugs.

The core means having a top forming portion; a plurality of skirt forming portions, circumferentially separated by a plurality of generally axially disposed channels in the outer peripheral wall of the core, each channel extending from at least a point intermediate the length of the core to the top forming portion and having its bed sloped generally radially inwardly in a direction towards said top forming portion from a position adjacent the other end of the channel; a plurality of riser segments corresponding to the plurality of channels, each riser segment secured for slidable movement within its corresponding channel, relative to the core, from a position completely within the channel having one end proximate the top forming portion of the core, to a position on the side of the top forming portion, remote the other end of the core, each riser segment being of substantially the same thickness as the corresponding depth of the channel in which it is situate when such end of the riser is proximate the top forming portion of the core so as to form on the outer periphery of such end of each riser, a top forming portion to co-act with the top forming portion of the core when juxtaposed therewith and skirt and securing means forming portions; means securing said riser segments within said channels.

16 Claims, 11 Drawing Figures

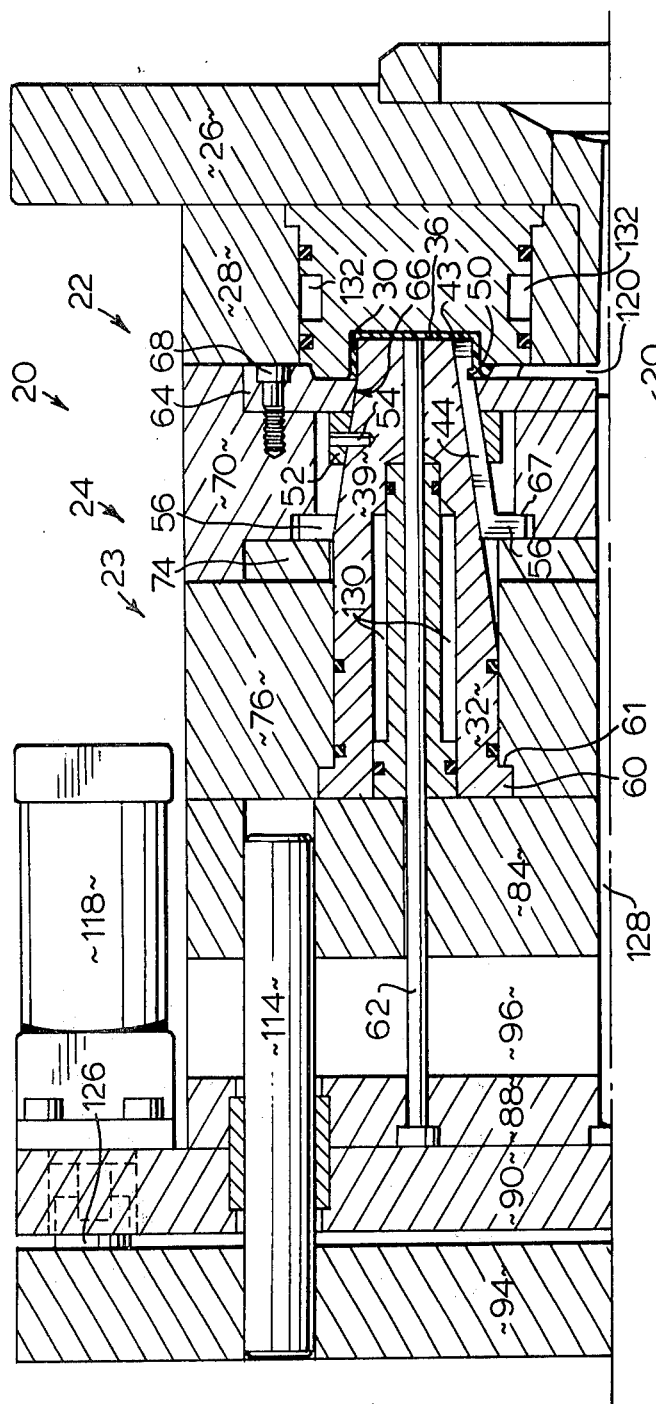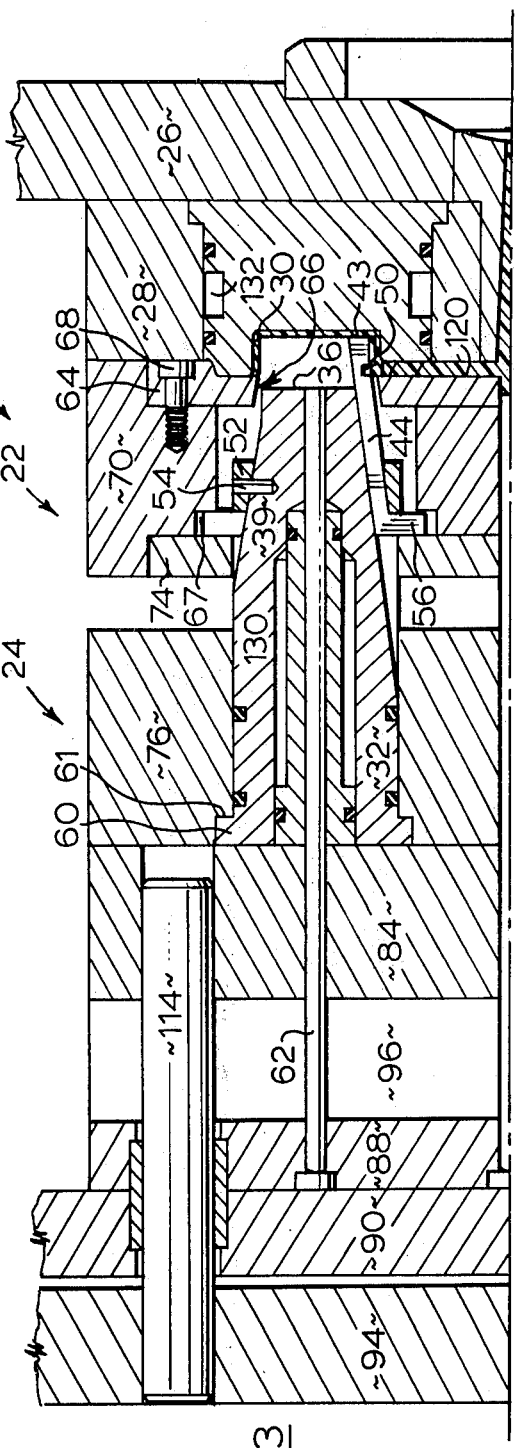
FIG. 2
FIG. 3

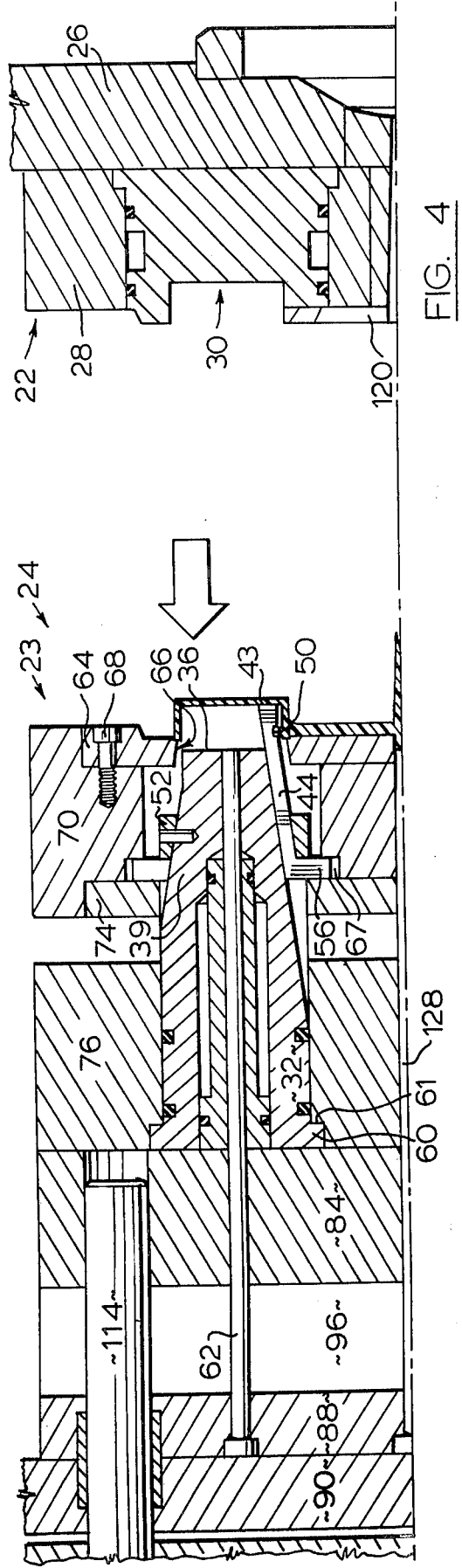
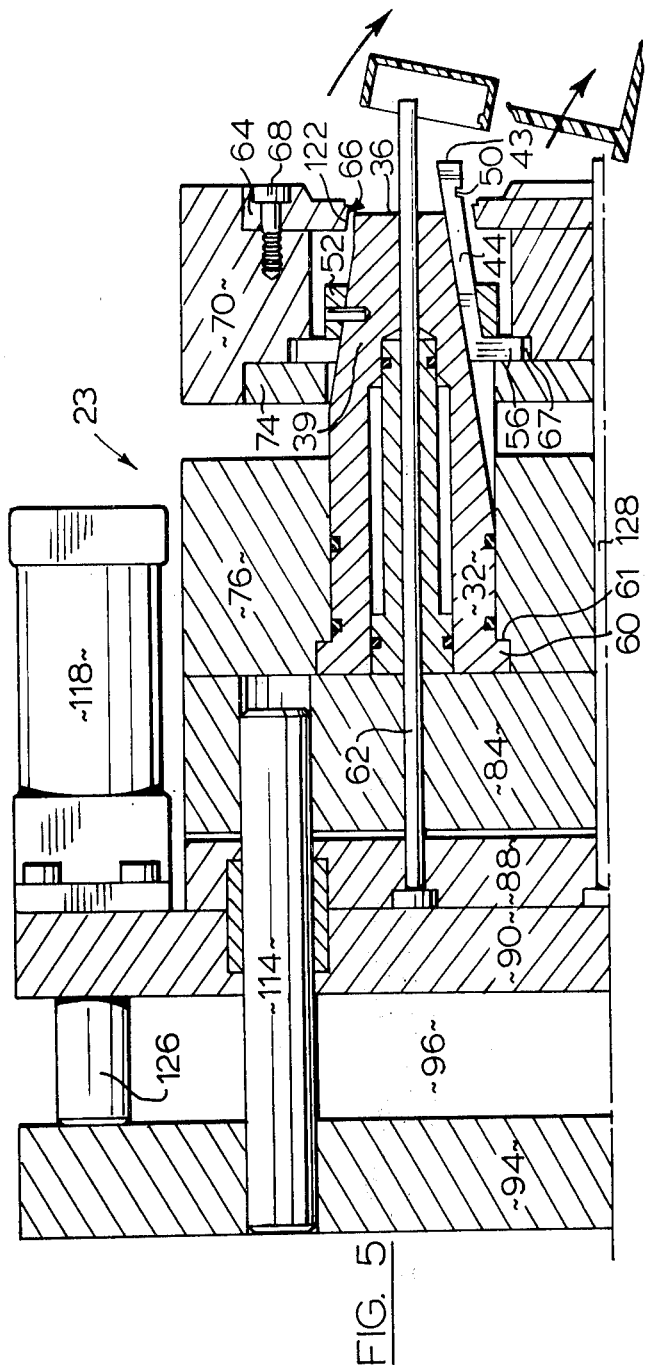
FIG. 4
FIG. 5

MOULD FOR CLOSURE CAPS WITH INTERMITTENT THREADS UNDERCUTS OR HOLD-DOWN LUGS

FIELD OF THE INVENTION

This invention relates to the manufacture of closure caps, particularly, closure caps with lugs, undercuts and intermittent or interrupted threads.

BACKGROUND OF THE INVENTION

Plastic closure caps can be manufactured in different ways, with continuous threads, with a partial or intermittent thread, more often called an interrupted thread, or with spaced hold-down lugs, used in, for example, child resistant safety vials, which may each be used in conjunction with liner retension segments, disposed on the inner surface of the skirt of the closure cap adjacent the undersurface of the cap. The interruped thread may comprise screw threading, interrupted by a plurality of axially extending gaps on the interior wall of the skirt and the lugs may be circumferentially spaced from one another on the inner wall of the skirt of the cap.

Although specialized systems have been proposed for the manufacture of closure caps having interrupted threads or lugs, because of the variance in the material used in the manufacture of such closure caps and the shape and size of the relevant component parts thereof, such systems have not been satisfactory.

One such system, manufactured by D.M.E. Corporation, includes what is usually called a collapsible core, comprising axially extending segments, the outer periphery of each comprising an arc of a circle, held together in assembled circular closure cap manufacturing relation, by a centre pin disposed on the longitudinal central axis of the core, and an outer ring. After the manufacture of the closure cap, the centre pin is moved out of the centre and the ring surrounding the segments, collapses the segments radially inwardly towards the axis, some collapsng further radially inwardly than others, to permit each segment to clear the undercuts of the thread and permit ejection of each closure cap without interference. Subsequently, the segments are repositioned by the longitudinal pin and ring and the cycle is repeated. However, this core is very expensive and its construction inherently limits the depth, or the thickness, of the thread finish to be manufactured on the skirt of the closure cap, particularly, closure caps smaller than 28 mm. Furthermore, if one of the segments breaks away, the entire core must be replaced thereby increasing substantially the maintenance costs of the system.

It is therefore, an object of this invention to provide an improved system and components therefor, used in manufacturing closure caps having interrupted threads or hold-down lugs, with or without liner retension segments, having improved characteristics, thereby minimizing initial cost and substantially reducing maintenance costs.

It is a further object of this invention to provide such a system having fewer components.

It is a further object of this invention to provide a more efficient system and components thereof, thereby maximizing product output.

It is still a further object of this invention to provide a system useful in manufacturing closure caps of a size less than 28 mm.

It is still a further object of this invention to provide a system suitable for the manufacture of deep closure caps.

It is still a further object of this invention to provide a system, including a core whereby any broken parts of the core can be individually replaced.

Still other objects and advantages of this invention will be realized by those skilled in the art from the following summary of the invention and more detailed description of preferred embodiments thereof.

SUMMARY OF THE INVENTION

According to one important aspect of the invention, a system and components therefor, used in the manufacture of closure caps with interrupted threads or hold-down lugs with or without liner retension segments, each closure cap having a top, a depending skirt and a plurality of interrupted threads, or hold-downn lugs, spaced one from the other by axially extending gaps, is provided including a core for such system, each core comprising (a) a top forming portion at one end thereof, (b) a plurality of skirt forming portions disposed alternately in the outer periphery of the core, with generally longitudinally disposed channels in the core, each channel extending from at least a point intermediate the length of the core to the top forming portion, having its bed sloped radially inwardly towards the central longitudinal axis of the core, from at least a point intermediate the length of the channel to the top forming portion.

According to another aspect of the invention, riser segments are secured for slidable movement relative to the core, within each channel on the sloped bed thereof from a position substantially within the channel and having one end thereof proximate the top forming portion of the core to a position on the side of th top forming portion remote the other end of the core.

According to another aspect of the invention, each riser segment is of substantially the same radial thickness as the corresponding depth of the channel in which it is seated when the one end of the riser, is proximate the top forming portion of the core.

According to another aspect of the invention, when each riser is substantially within the channel having one end proximate the top forming portion of th core, such end of the riser is positioned to co-act with the top forming portion of the core and a radially outer peripheral portion of the riser is provided comprising a skirt forming portion of the riser of substantially the same length as the skirt forming portion of the core.

According to another aspect of the invention, securing means comprising an interrupted thread or lug forming portion is disposed on the skirt forming portion of each riser with or without a liner retension forming portion.

According to another aspect of the invention, means are provided for securing said riser segments for relative movement with respect to the core within said channels including an outwardly directed projection or flange disposed upon the end of each riser remote the top forming portion.

According to another aspect of the invention, the system includes means to limit the relative movement of the risers with respect to the core from a position where one end of the riser is positioned to co-act with the top forming portion of the core to a position where such end of the riser is moved to a position on the side of the top forming portion of the core remote the other end of the core and means to accomodate the outwardly directed projections on the ends of the risers for simultaneous movement of the risers relative the core.

According to another aspect of the invention, the system includes means operable with the core to manufacture the closure caps including an inlet for introducing molten polymeric material into the system from which the closure is to be manufactured and male and female mould portion, the female mould portion including means to form the outer configuration of the top of the closure cap, and the male mould portion mounting the core including means accomodating the outwardly directed projections of the riser means for longitudinally separating the male mould portion from the female mould portion from their closure cap forming position, relative to one another and withdrawing the core relative to the risers in the direction away from the female mould for collapsing the risers radially inwardly thereby causing the projections to ride radially inwardly for disposing the formed closure cap out of contact with the riser segments, until the closure cap is ejected, means for ejecting the formed closure cap and means for reciprocating the member components for repeating the cycle.

Preferably the female mould is stationary and includes the inlet for feeding the molten plastics material into a cavity between the male and female mould portions when in the closure cap forming position relative to one another and the male mould portion moves relative to the female mould portion. Preferably the operating axis of the system and thus the core is in a horizontal plane to permit the manufactured closure caps to fall downwardly by gravity clear of both mould portions, when ejected by the ejector means.

BRIEF DESCRIPTION OF THE DRAWINGS

The invention will now be illustrated with reference to the following drawings, in which preferred embodiments thereof have been illustrated.

FIG. 2 is a partial vertical cross section, taken along the line 2—2 of FIG. 1, and looking in the direction of the arrows when the male and female portions are in closure cap forming relation illustrating lug forming portions on the risers according to a second preferred embodiment of the invention.

FIG. 3 is a similar vertical cross sectional view as in FIG. 2, except that the male mould portion has been withdrawn in a direction away from the female mould portion.

FIG. 4 is a similar view to FIG. 3, except the male mould portion has been further withdrawn from the female portion.

FIG. 5 is a similar view to FIG. 4, except that the female mould portion is not shown and the formed closure cap has been ejected.

DETAILED DESCRIPTION OF THE PREFERRED EMBODIMENTS

Figure 1:
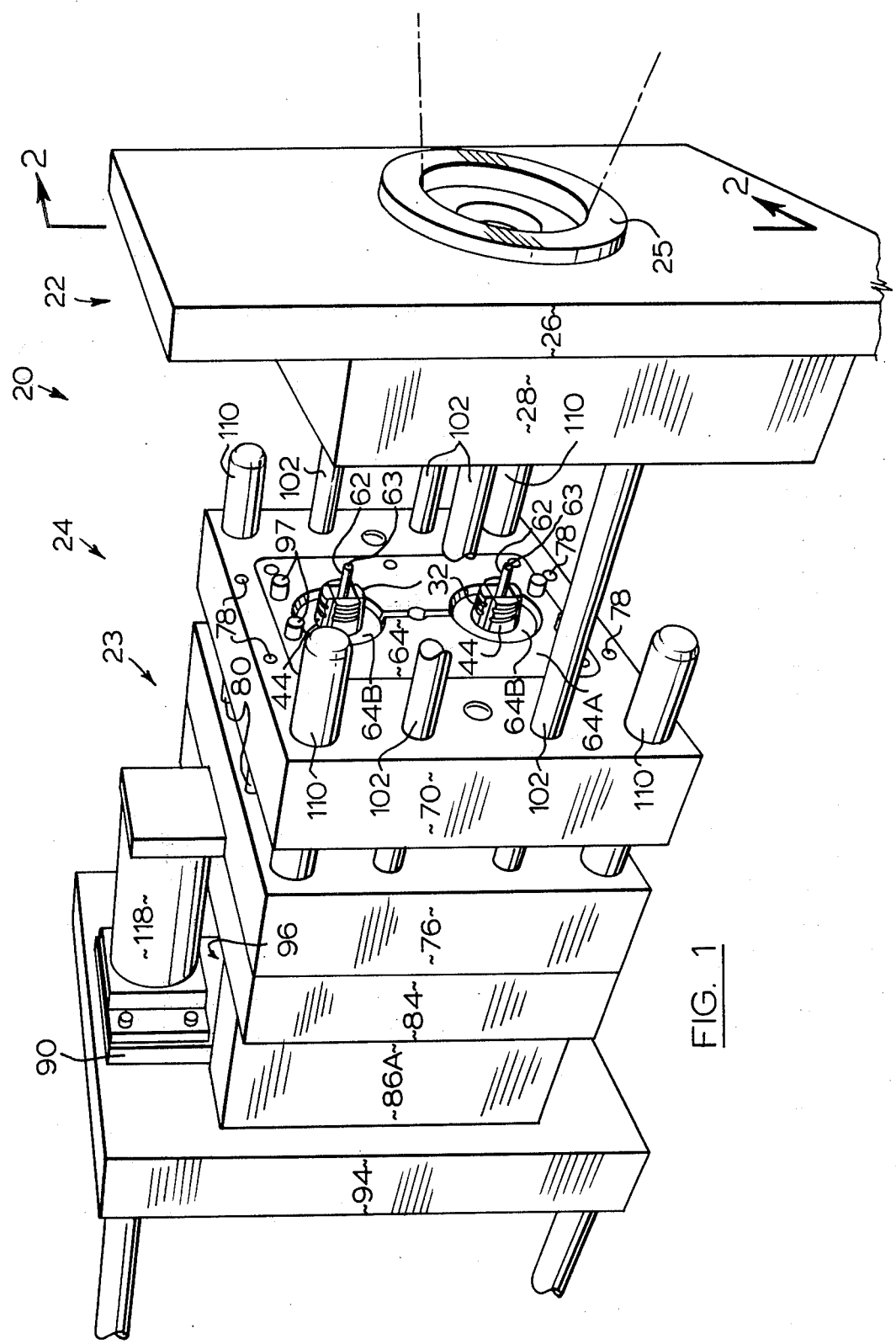
FIG. 1 is a perspective view of a system useful in the manufacture of closure caps with interrupted threads according to a preferred embodiment of the invention, illustrating male and female mould portions in withdrawn relation after the manufactured closure cap has been ejected and prior to the closing of the system for repetition of the cycle.

Referring particularly to FIG. 1 there is shown a moulding system 20 comprising stationary female mould portion 22 and male mould portion 24 reciprocally moveable with respect to female mould portion 22. Female mould portion 22 comprises top mounting plate 26 having locating ring 25 for fastening mould portion 22 to a press (not shown), and cavity plate 28. On the side of cavity plate 28 remote top mounting plate 26 are, cavity 30 seen best in FIG. 4, used for forming the outer configuration of the top and skirt of the closure cap to be formed and, inlet 120 seen best in FIGS. 2, 3 and 4, for feeding the necessary molten plastics material into cavity 30 for forming the closure cap.

Figure 10:
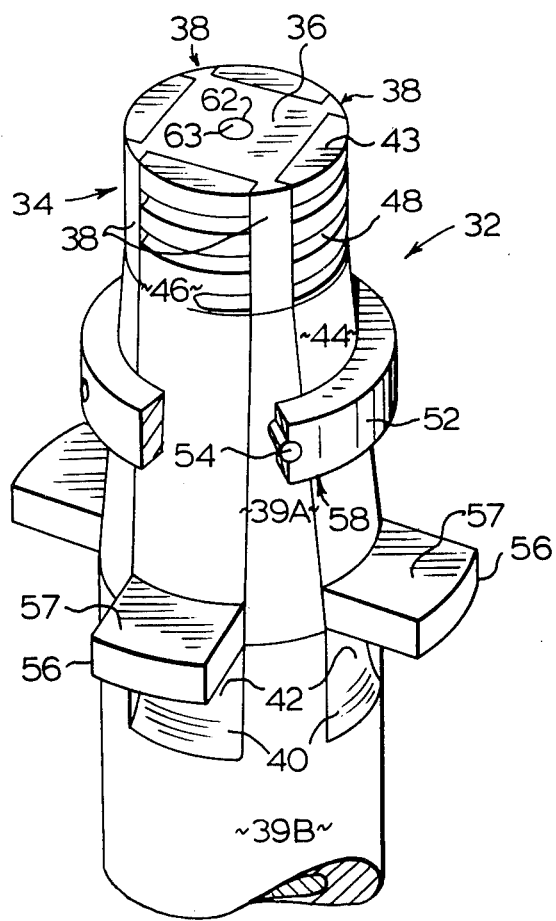
FIG. 10 is a perspective view of a core according to the first preferred embodiment of the invention.
Figure 11:
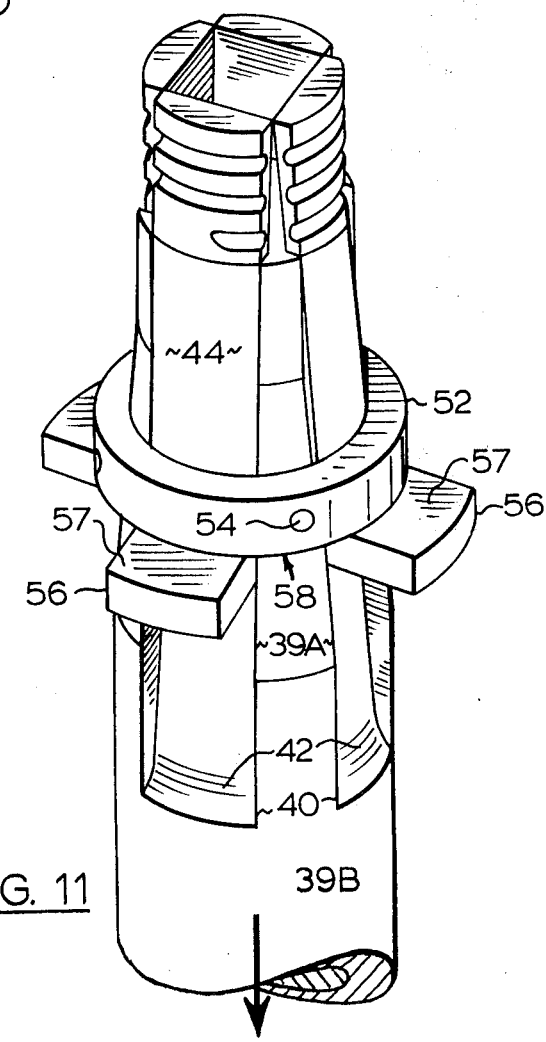
FIG. 11 is a perspective view of the core shown in FIG. 10 in a withdrawn position relative to the riser segments, the riser segments having collapsed radially inwardly.

Core 32, seen in cross-section in FIGS. 2, 3, 4, and 5, in one form mounted for closure cap forming operation in male mould portion 24 and in perspective in FIGS. 10 and 11 in another form, and in various modes of operation, is used to operate in conjunction with cavity 30 to manufacture the under side of the top, and inner side wall of the skirt together with the interrupted thread or hold-down lugs, respectively, of the closure cap. To this end, core 32 has a closure cap forming portion 34, seen best in FIG. 10 adjacent one end of core 32 having substantially planar end 36 disposed substantially perpendicular to the longitudinal axis of core 32 for forming the underside of the top of the closure cap and a plurality of skirt forming portions 38 disposed in core 32, substantially perpendicular to end 36, and separated from one another by the upper end of channels 40.

Tapering radially outwardly from the skirt forming portions 38, is conical portion 39A extending to cylindrical portion 39B, portions 39A and 39B disposing the lower portions of channels 40. Each of channels 40 disposed in core 32 has bed 42 sloping radially inwardly from a point intermediate either end of core 32 and extending to end 36. Disposed and secured in each of channels 40 for relative movement therein are riser segments 44 being generally L-shaped and of substantially the same thickness as the same depth of the channel portion in which it seats, when the end 43 of the riser 44 is proximate end 36. Therefore, portion 46 of riser 44 adjacent end 36 and skirt forming portions 38 of core 32 are disposed substantially perpendicular to end 36 to provide further skirt forming portions, which taken together with portions 38, form an annular peripheral configuration which forms the inner wall of the skirt of the formed closure cap. Each portion 46 also provides means for manufacturing the securing means on the formed closure cap, which in FIGS. 10 and 11 comprise threaded portions 48 on portions 46 to provide an interrupted screw threading on the interior wall of the skirt of the closure cap and which in FIGS. 2–5 inclusive, provide a notch 50 used to manufacture hold-down lugs used in, for example, child resistant safety vials. Ring 52 is secured by pin 54 to core 32 to maintain riser segments 44 within channels 40 at all times. At the end of riser segments 44 opposite end 43 are stop or detente flanges 56 for the purposes as hereinafter described.

Core 32 has at the end opposed the top forming portion an annular flange 60, seen best in FIGS. 2–5, inclusive, of greater diameter than any part of core 32. Each riser 44 is of constant thickness between flange 56 and skirt forming portion 46 so as to be slidable within each channel 40 from a position whereat the upper end 43, riser 46 is co-planar with top 36 of core 32 to a position where the side of ring 58 remote end 36 is disposed adjacent the upper side 57 of flange 56, both seen best in FIGS. 10 and 11.

Extending longitudinally within core 32 is pin 62, seen in cross-section in FIGS. 2–5, and in FIGS. 1 and 10. Pin 62 operates from a position shown in FIG. 10, wherein its upper end 63 is co-planar with top 36 to a position, seen in FIGS. 1 and 5, spaced from top 36 on the side thereof remote Flange 60.

Figure 7:
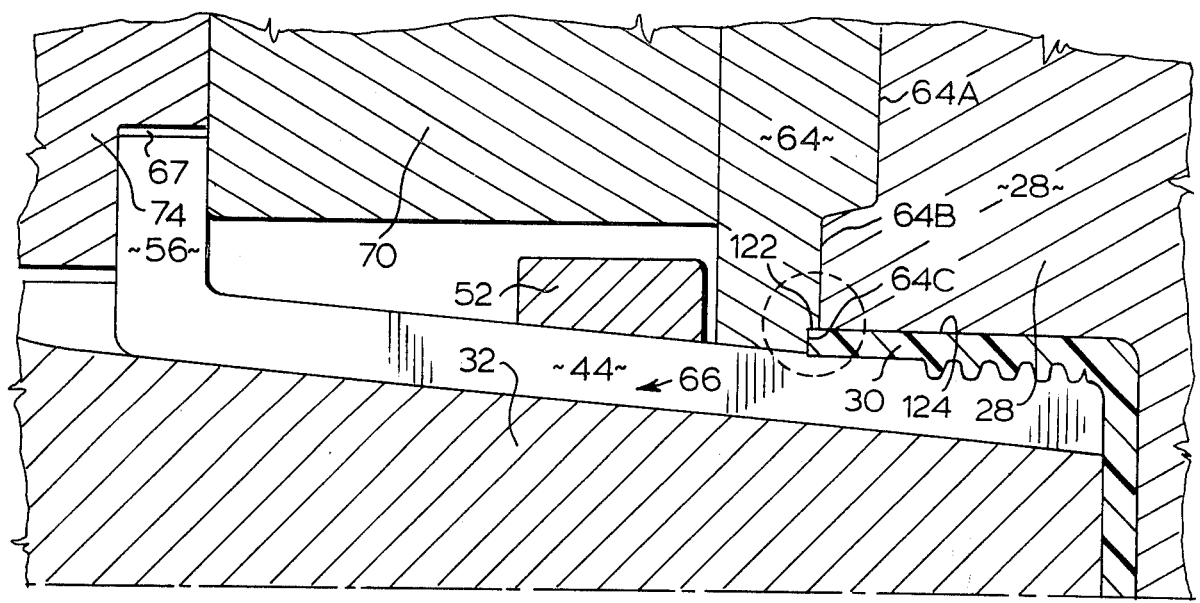
FIG. 7 is a close-up of part of FIG. 2, except the lug forming portion of the riser is an interrupted thread forming portion as shown in FIG. 1.
Figure 8:
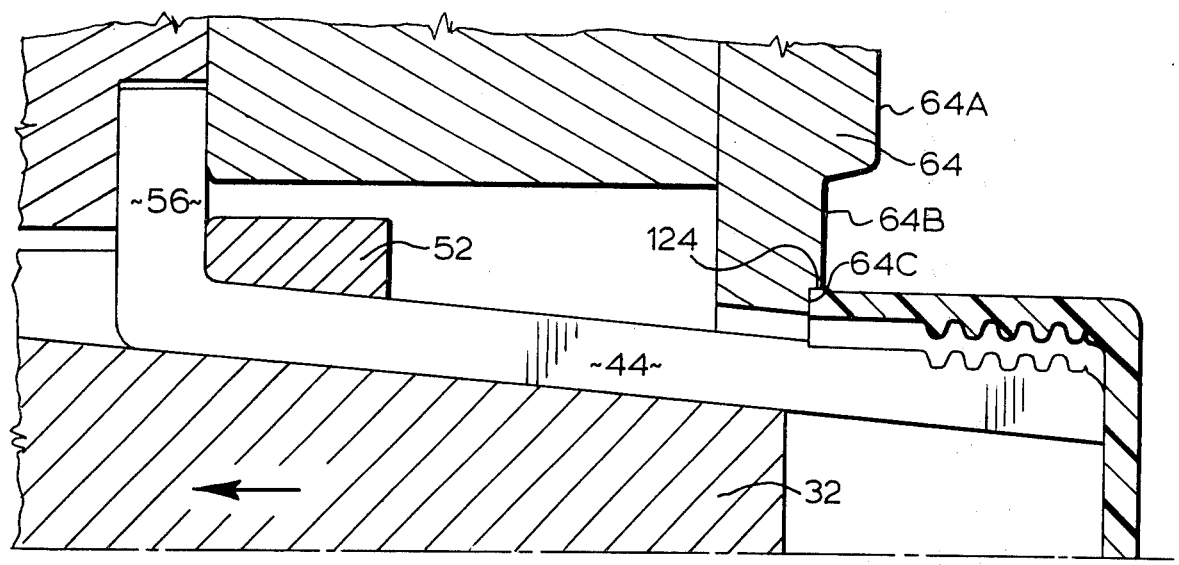
FIG. 8 is a close-up of a part of FIG. 3 except the lug forming portion of the riser is an interrupted thread forming portion as in FIG. 1.

For securing core 32 for co-operation with cavity 30, of female mould portion 22 for forming closure caps with interrupted threads or hold-down lugs with or without liner retension segments, these embodiments further provide a mounting assembly 23 which comprises male mould portion 24 excluding core 32 and associated components thereof, for example, risers 44, ripg 58 and pin 62, including prehardened stripper face plate 64 having stepped portions 64A, 64B and 64C extending to a central aperture 66, seen best in FIG. 7, through which core 32 projects, steps 64B and 64C separated by wall 122 being sloped radially outwardly, looking towards flange 60, for the purposes hereinafter described.

Plate 64 is secured by bolts 68 (seen in FIG. 2) to stripper plate riser holder 70 and by bolts 72 (Seen in FIG. 6) through stripper plate riser holder 70, to riser retainer plate 74. Stripper plate riser holder 70 is in turn secured to core plate 76 by bolt 78, having head 79, (seen in FIGS. 1 and 6) secured to core plate 76 and projecting through slot 80 in stripper plate riser holder 70, for movement in slot 80 in stripper plate riser holder 70 of bolt 78 from a position whereat head 79, abuts bottom 82 of slot 80 to a position spaced from it, closer female mould portion 22. Flanges 60 of core 32 seat in recess 61, in core plate 76 for locking core 32 in relation to core plate 76. It is of course understood that each of core plate 76, riser retainer plate 74, stripper plate riser holder 70, have appropriately dimensioned apertures therethrough so aligned with aperture 66 of prehardened stripper face plate 64 so as enable core 32 to project therethrough. Additionally, stripper plate riser holder 70 includes an annular recess 67 adjacent its end remote prehardened stripper face plate 64 about the aperture therethrough for the purposes hereinafter described.

Core back plate 84 is mounted behind flange 60 of core 32 and secured to abut against core plate 76 for acting as a detent to prevent movement of core 32 relative to core plate 76 and core back plate 84. Secured to core back plate 84 is a pair of spacer blocks 86, seen best in FIG. 6 (one of which being shown in FIG. 1 as 86A). Disposed therebetween are ejector retension plate 88 and ejector plate 90 (seen best in FIGS. 2–6 inclusive) secured to one another by bolt 92 (seen in FIG. 6), of lesser axial length than spacer blocks 86. Secured behind spacer blocks 86 is a back mounting plate 94 to which they are secured. Securing back mounting plate 94, spacer block identified as 86A, core back plate 84, and core plate 76, for no relative movement with respect to each other, is bolt 98 passing through each of plate 94, block 86A, plate 84 and secured into plate 76.

Return pin 97 extends from back mounting plate 94 into space 96 created between spacer blocks 86 and through eject retension plate 88 and ejector plate 90, through core back plate 84, core plate 76, stripper plate riser holder 70, and may extend through riser retainer plate 74 and prehardened stripper face plate 64 (but in these embodiments does not as shown in FIG. 1) to the face of male mould portion, and is adapted to reciprocate simultaneously with pin 62. Secured to ejector retension plate 88 is ejector pin 62. Therefore, when ejector retension plate 88 and ejector plate 90 reciprocate within cavity 96, both return pin 97 and ejector pin 62 are also reciprocated.

Securing risers 44 for no relative longitudinal movement with respect to stripper plate riser holder 70 are flanges 56 extending into annular recess 67 of a size to accommodate the thickness of flange 56, to cause flange 56 to abut riser retainer plate 74. Therefore, each riser 44 is precluded from longitudinal axial movement relative to both stripper plate riser holder 70 and riser retainer plate 74, but is free to move radially inwardly towards, and radially away from the axis of core 32 for the purpose as hereinafter described.

Figure 6:
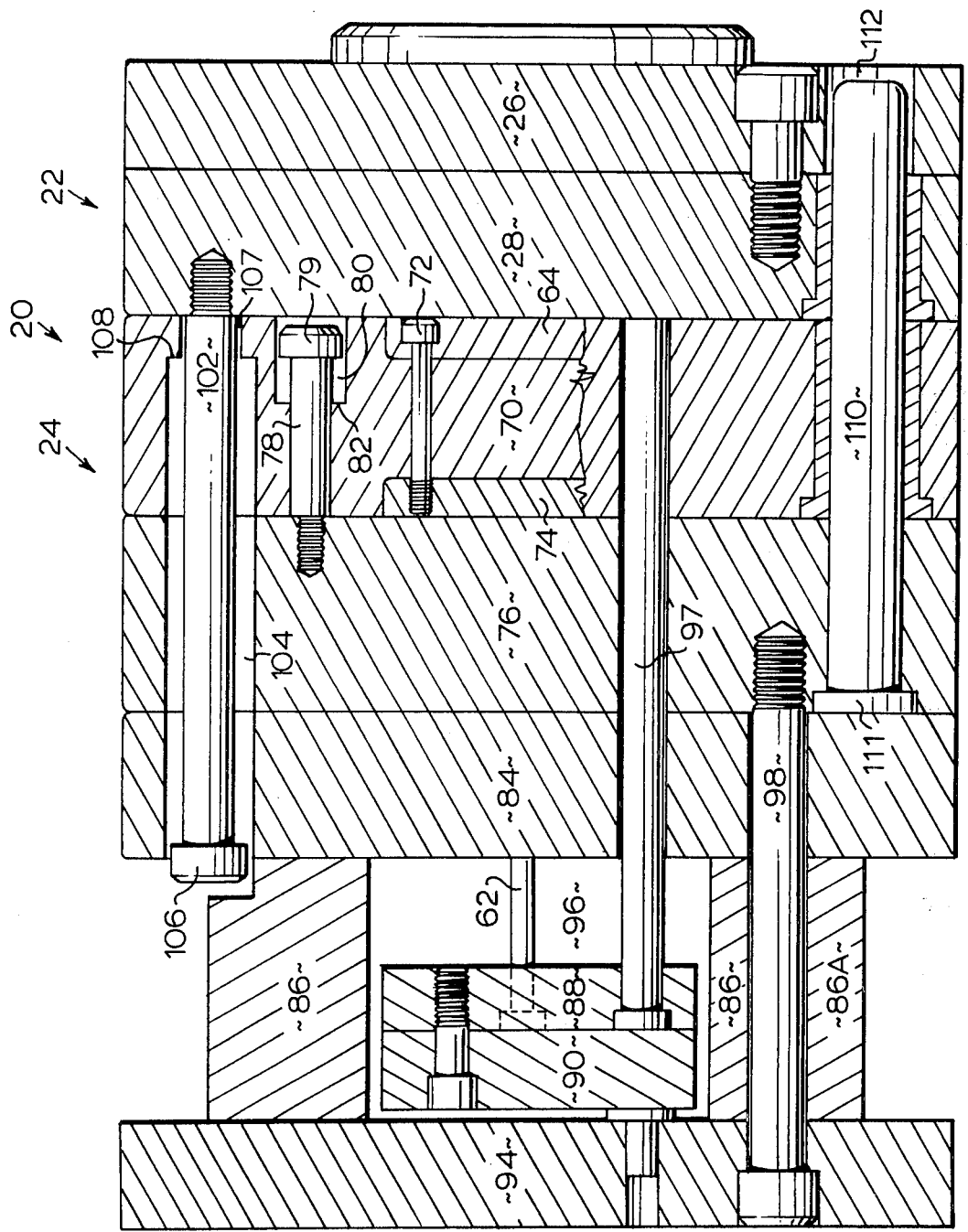
FIG. 6 is a horizontal section taken in various planes in FIG. 1 to illustrate the various functional parts used to reciprocally operate the system.

Securing male mould 24 to female mould 22 are bolts 102, only one of which is seen in FIG. 6, each bolt having head 106, disposed in and passing through, slot 104 of greater diameter than head 106, disposed in core back plate 84, core plate 76 and stripper plate riser holder 70, and restricted aperture 107 adjacent cavity plate 28, restricted in size from slot 104 by shoulder 108, which provides a seat against which head 106 abuts when male mould portion 29 is withdrawn from female mould portion 22.

A plurality of guides 110, only one of which is seen in FIG. 6, is provided at the four corners of stripper plate riser holder 70, each of which is secured in an annular recess in core plate 76 to abut core back plate 84 to preclude relative movement thereof, for projecting through core plate 76, stripper riser holder 70 and into female mould portion 22 through cavity plate 28 and into top mounting plate 26 by means of a slot 112 therethrough to assist in guiding female mould portion 22 and male portion 24 into closure cap forming position. Further guide and alignor means have been provided, as for example, pin 114, extending between core back plate 84 and back mounting plate 94, on which ejector retension plate 88 and ejector plate 90 are supported for reciprocation in cavity 96 formed by spacer blocks 86. Two cylinders 118, mounted above and below male portion 24, only one of which is shown and a third cylinder mounted on the side of the back mounting plate 94 remote core 32 (also not shown) have been provided for the purposes hereinafter described.

The operation of the system 20 for the production of a closure cap will now be described with reference primarily to FIGS. 2 and 6 inclusive. FIG. 2 illustrates the male portion 24 and female portion 22 in closure cap forming position wherein the ends 43 of risers 44 are co-planar with the top 36 of core 32. In this position, cavity 30 is filled with polymeric material for forming the closure cap through feed inlet 120. For dispersal of the heat generated by the molten plastics, the system may include cooling channels 130 and 132, through which water may be fed through inlets and discharged through outlets (not shown), to remove such heat as would be well understood by those skilled in the art.

Figure 9:
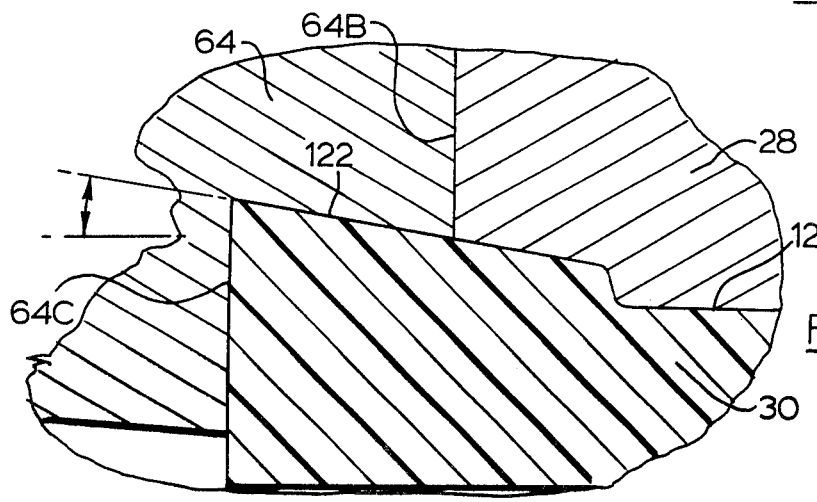
FIG. 9 is a close-up of the portion circled in FIG. 7.

Referring to FIG. 7, when the cavity comprising the space between core 32 and cavity 30 of cavity plate 28 is filled with molten plastics material, the space adjacent the back or outwardly tapered wall 122 between step 64B and 64C of prehardened plate 64 and adjacent wall 124 defining the outer extent of cavity 30 adjacent step 64B are filled, particularly shown best in FIGS. 7 and 9 for the purposes hereinafter discussed.

After permitting the moulded closure cap sufficient time to harden sufficiently, ejection from the system is provided as follows. With reference to FIG. 6, the third cylinder, not shown, operates on back mounting plate 94 and withdraws it in a direction away from the female mould portion 22. Therefore, spacer blocks 86, core back plate 84 and core plate 76 are withdrawn by virtue of their attachment to back mounting plate 94 by means of pin 98, pin 110 acting as a guide in the withdrawing of such components. In turn, bolt 80, secured to core plate 76 is also withdrawn until bolt head 78 contacts the bottom of slot 82. Since core 32 is secured by annular flange 60 to core plate 76, seen best in FIG. 2, it is also withdrawn. Since ring 52 is attached to core 32 by pin 54, it too is withdrawn in a direction away from female mould 22, from a position adjacent or proximate prehardened face plate 64 to a position adjacent flange 56 when bolt head 78 contacts the bottom of slot 82. However, riser segments 44 are not so connected being retained in recess 67 of stripper plate riser holder 70 and therefore remain stationary in the longitudinal or axial direction, relative to female mould portion 22, as seen in FIG. 3. The longitudinal or axial distance the core and thus ring 52 retract relative to the riser segments 44 is the distance the head of the bolt is spaced from the bottom 82 of the slot in which it is adapted to reciprocate when the male mould portion 24 and female mould portion 22 are juxtaposed in closure cap manufacturing position shown in FIG. 2. However, because ring 52 rides along riser segments 44 from a position adjacent stripper plate 64 to a position adjacent flange 56, equal to the longitudinal distance bolt head 82 moves, riser segments 44 are forced radially inwardly (seen best in FIG. 11) and clear the inner radial extent of the interrupted threads or lugs of the formed closure cap, (seen best in FIG. 3).

Male mould portion 24 is further withdrawn from female portion 22 for ejection of the finished cap as follows. When bolt head 78 abuts bottom 82 of the slot, further withdrawal of male mould portion 24 by the third cylinder (not shown) causes stripper plate riser holder 70 to withdraw from female mould portion 22 seen in FIG. 4. Since riser segments 44 have now collapsed radially inwardly clearing the interrupted threads formed in the closure cap, the back taper of wall 122 between steps 64B and 64C seen best in FIG. 9, maintains the rim of the formed closure cap and thus the closure cap radially spaced from each of riser segments 44 by virtue of a pressure fit between the rim and the back taper of wall 122. As a result, the formed cap cannot interfere with riser segments 44 and cannot become caught in the interrupted thread forming portions of such riser segment 44, prior to ejection as shown in FIG. 4. As a result, the formed closure cap and male mould portion are withdrawn from the female mould portion until the head 106 of bolt 102 seats on annular shoulder 108 in stripper riser plate holder 70. In operation, it has been found that when the third cylinder acts to withdraw back plate 94, spacer blocks 86, core back plate 84, core plate 76, it frequently also withdraws stripper plate riser holder 70, and prehardened stripper face plate 64 until bolt head 106 seats on should 108, thereby separating mould portions 22 and 24. Subsequently, any further withdrawal of back plate 94 by the third cylinder causes separation of core plate 76 and stripper plate riser holder 70 until bolt head 79 seats on bottom 82 of slot 80, thereby causing the riser segments to collapse radially inwardly, as discussed previously. In either case, the relative positions of the components shown in FIG. 4, is reached with no deleterious affects on either the moulding system or the formed closure cap. The attainment of the position shown in FIG. 4, causes the cylinders 118, secured to ejector plate 90 (only one of which is shown) to become activated, forcing piston 126 against back mounting plate 94 (Seen in FIGS. 2 and 5) thereby moving ejector plate 90 towards female mould portion 22 causing ejector pin 62, pin 97 and runner ejector pin 128 to be moved towards female mould portion 22, pin 62 contacting the underside of the top of the formed closure cap and exerting sufficient force thereon to force the rim of the closure out of the back taper of wall 122, seen in FIG. 5, and thereafter extending beyond riser segments 44 to force the closure cap beyond the longitudinal or axial extent of the riser segments and permit it to fall downwardly into a suitable receptacle (not shown).

In the manufacture of the closure cap, some of the molten polymeric material fed through inlet 120 into cavity 30 remains in the inlet and beads at the entrance thereof, and is known in the art as a runner. Pin 128 is provided to reciprocate simultaneously with pin 62 to eject the runner as is well known in the art. The above steps are then reversed to close the male and female mould portions into closure cap forming relation and the cycle is repeated.

It is of course, obvious that a plurality of cores 32 may be operated simultaneously, incorporating them into an operating system discussed above, appropriately modified to accommodate the number of cores desired, including the provision of suitable means for acting on each core for withdrawing the core relative to the riser segments in a direction away from the female mould for collapsing the riser segments radially inwardly and for longitudinally separating the male and female mould portions, while maintaining the cap out of contact with the collapsed risers for ejecting the closure cap and for reciprocating the member components to close the male and female mould portions into closure cap forming relation so as to enable the cycle to be continuously repeated.

As many changes can be made in the construction of the core and the means used to operate the core without departing from the scope of the invention, it is intended that all matter contained herein shall be deemed to be illustrative only of the invention and shall not be interpreted in a limiting sense.

We claim:

1. A core, useful for moulding closure caps, each closure cap having a top, a depending skirt, and having securing means secured to the inner wall of the skirt, said securing means comprising interrupted threads or hold-down lugs, said core having:
  a. a top forming portion;
  b. a plurality of skirt forming portions, circumferentially separated by a plurality of generally axially disposed channels in the outer peripheral wall of the core, each channel extending from at least a point intermediate the length of the core to the top forming portion and having its bed sloped generally radially inwardly in a direction towards said top forming portion from a position adjacent the other end of the channel;
  c. a plurality of riser segments corresponding to the plurality of channels secured for slidable movement within the channels, relative to the core, each riser segment having an outwardly directed flange secured on the end of the segment opposite the top forming portion to permit simultaneous movement of the riser segments relative to the core from a position completely within the channel having one end proximate the top forming portion of the core, to a position on the side of the top forming portion, remote the other end of the core, each riser segment being of the same thickness as the corresponding depth of the channel in which it is situate when such end of the riser is proximate the top forming portion of the core so as to form on the outer periphery of such end of each riser, a top forming portion to co-act with the top forming portion of the core when juxtaposed therewith and skirt and securing means forming portions; and
  d. an annular ring secured about the periphery of said core and over said channels and said risers for securing said riser segments within said channels.

2. The combination of claim 1, wherein the portion of the core adjacent said skirt forming portions tapers radially outwardly away from the longitudinal axis of the core to at least a point intermediate the other end.

3. A core, useful for moulding closure caps, each closure cap having a top, depending skirt substantially perpendicular to the top and having securing means secured to the inner wall of the skirt, said securing means comprising interrupted threads or hold-down lugs, said core having:
  a. a top forming portion;
  b. a plurality of skirt forming portions, circumferentially separated by a plurality of generally axially disposed channels in the outer peripheral wall of the core, each channel extending from at least a point intermediate the length of the core to the top forming portion and having its bed sloped generally radially inwardly in a direction towards the said top forming portion from a position adjacent the other end of the channel;
  c. a plurality of riser segments corresponding to the plurality of channels, secured for slidable movement within the channels relative to the core, each riser segment having an outwardly directed flange secured on the end of the segment opposite the top forming portion to permit simultaneous movement of the riser segments relative to the core from a position completely within the channel, having one end proximate the top forming portion of the core, to a position on the side of the top forming portion remote the other end of the core, each riser segment being of the same thickness as the corresponding depth of the channel in which it is situate when such end of the riser is proximate the top forming portion of the core so as to form on the outer periphery of such end of each riser a top forming portion to co-act with the top forming portion of the core when juxtaposed therewith and skirt and securing means forming portions; an annular ring secured about the periphery of said core and over said channels and said risers for securing said riser segments within said channels, and axially slidable closure cap ejector means within the core reciprocally moveable from a position within the core towards the top forming portion to a position on the side of the top forming portion remote the other end of the core.

4. The combination of claim 3, wherein the portion of the core adjacent said skirt forming portions tapers radially outwardly away from the longitudinal axis of the core to at least a point intermediate the other end.

5. A moulding system for manufacturing closure caps, each closure cap having a top, depending skirt and securing means secured to the inner wall of the skirt, said securing means comprising interrupted threads or hold-down lugs, including inlet means for introducing molten polymeric material into such system for use in forming the closure cap, comprising male and female mould portions, the female mould portion including means for co-acting with a core for forming the outer configuration of the top and the male mould portion including at least one core, each core having:
  a. a top forming portion;
  b. a plurality of skirt forming portion circumferentially separated by a plurality of generally axially disposed channels in the outer peripheral wall of the core, each channel extending from at least a point intermediate the length of the core to the top forming portion and having its bed sloped generally radially inwardly in a direction towards said top forming portion from a position adjacent the other end of the channel;
  c. a plurality of riser segments corresponding to the plurality of channels, secured for slidable movement within the channels relative to the core each riser segment having an outwardly directed flange secured on the end of the segment opposite the top forming portion to permit simultaneous movement of the riser segments relative to the core from a position completely within the channel having one end proximate the top forming portion of the core, to a position on the side of the top forming portion remote the other end of the core, each riser segment being of the same thickness as the corresponding depth of the channel in which it is situate, when such end of the riser is proximate the top forming portion of the core so as to form on the outer periphery of such end of each riser, a top forming portion to co-act with the top forming portion of the core when juxtaposed therewith and skirt and securing means forming portions;
  d. means securing said riser segments within said channels;
  e. means for longitudinally separating the male and female mould portions and for withdrawing the core relative to the risers in a direction away from the female mould portion for collapsing the risers radially inwardly, including means engaging the front and rear faces of the flanges at all times to support said flanges of the risers to permit radial movement of the flanges relative to said means engaging said faces of the flanges as the core is withdrawn relative to the risers but precluding any longitudinal movement of said flanges relative to said means engaging the faces of said flanges;

f. means for ejecting the formed closure caps and means for reciprocating said male and female portions, and said core relative to said risers, into closed closure cap forming relation.

6. The moulding system of claim 5 wherein said means for ejecting the forward closure cap comprises axially slidable closure cap ejector means reciprocally slidable within the core from a position within the core towards the female mold portion to eject the formed closure cap.

7. The system as claimed in claim 5, wherein said means securing said riser segments within said channels comprises an annular ring secured about the periphery of said core over said channels and said risers.

8. The system as claimed in claim 5, wherein the portion of the core adjacent said skirt forming portion tapers radially outwardly away from the longitudinal axis of the core to at least a point intermediate the other end.

9. The system as claimed in claim 5, further including a stripper face plate at the end of the male mould portion, abutting the female mould portion when the male and female mould portions are in closure cap forming relation, said face plate having an aperture therethrough, through which the top and skirt forming portions of the core and riser segments project, said face plate having an annular closure cap rim forming recess disposed about the aperture through which the core extends, and said means for holding the formed closure cap out of contact with said riser segments, when said riser segments collapse radially inwardly and said male and female mould portions are longitudinally separated comprises, the wall of the recess defining the radially outward extent thereof being tapered radially outwardly away from the core, in a direction towards the end of the core remote the stripper face plate, to form a back taper in the recess, which when filled with molten polymeric material in the formation of the closure cap, holds the formed closure cap out of contact with the collapsed riser segments when the male mould portion is withdrawn from the female mould portion.

10. The moulding system of claim 5 wherein said means engaging said faces of said flanges includes at least one recess formed for accommodating said flanges.

11. A moulding system for manufacturing closure caps, each closure cap having a top, depending skirt and securing means secured to the inner wall of the skirt, said securing means comprising interrupted threads or hold-down lugs, including inlet means for introducing molten polymeric material into such system for use in forming the closure cap, comprising male and female mould portions, the female mould portion including means for co-acting with a core for forming the outer configuration of the top and the male mould portion including at least one core, each core having:

a. a top forming portion;
b. a plurality of skirt forming portions circumferentially separated by a plurality of generally axially disposed channels in the outer peripheral wall of the core, each channel extending from at least a point intermediate the length of the core to the top forming portion and having its bed sloped generally radially inwardly in a direction towards said top forming portion from a position adjacent the other end of the channel;
c. a plurality of riser segments corresponding to the plurality of channels, secured for slidable movement within the channels relative to the core, each riser segment having an outwardly directed flange secured on the end of the segment opposite the top forming portion to permit simultaneous movement of the riser segments relative to the core, from a position completely within the channel having one end proximate the top forming portion of the core, to a position on the side of the top forming portion remote the other end of the core, when each riser segment being of the same thickness as the corresponding depth of the channel in which it is situate, such end of the riser is proximate the top forming portion of the core so as to form on the outer periphery of such end of each riser, a top forming portion to co-act with the top forming portion of the core when juxtaposed therewith and skirt and securing means forming portions;
d. means securing said riser segments within said channels;
e. means for longitudinally separating the male and female mould portions and for withdrawing the core relative to the risers in a direction away from the female mould portion for collapsing the risers radially inwardly, including means engaging the front and rear faces of the flanges at all times to support said flanges of the risers to permit radial movement of the flanges relative to said means engaging said faces of the flanges as the core is withdrawn relative to the risers but precluding any longitudinal movement of said flanges relative to said means engaging the faces of said flanges;
f. means for holding the formed closure cap out of contact with said riser segments when said riser segments collapse radially inwardly and said male and female mould portions are longitudinally separated;
g. means for ejecting the formed closure cap and means for reciprocating said male and female mould portions, and said core relative to said risers, into closed closure cap forming relation.

12. The moulding system of claim 11 wherein said means for ejecting the forward closure cap comprises axially slidable closure cap ejector means reciprocally slidable within the core from a position with the core towards the female mold portion to eject the formed closure cap.

13. The moulding system of claim 11 wherein said means securing said riser segments within said channels comprises an annular ring secured about the periphery of said core over said channels and said risers.

14. The system as claimed in claim 11, further including a stripper face plate at the end of the male mould portion, abutting the female mould portion when the male and female mould portions are in closure cap forming relation, said face plate having an aperture therethrough, through which the top and skirt forming portions of the core and riser segments project, said face plate having an annular closure cap rim forming recess disposed about the aperture through which the core extends, and said means for holding the formed closure cap out of contact with said riser segments, when said riser segments collapse radially inwardly and said male and female mould portions are longitudinally separated comprises, the wall of the recess defining the radially outward extent thereof being tapered radially outwardly away from the core, in a direction towards the end of the core remote the stripper face plate, to form a back taper in the recess, which when filled with molten polymeric material in the formation of the closure cap, holds the formed closure cap out of contact with the collapsed riser segments when the male mould portion is withdrawn from the female mould portion.

15. The system as clamed in claim 11 wherein the portion of the core adjacent said skirt forming portion tapers radially outwardly away from the longitudinal axis of the core to at least a point intermediate the other end.

16. The moulding system of claim 11 wherein said means engaging said faces of said flanges includes at least one recess formed for accommodating said flanges.

* * * * *